July 12, 1960
A. G. CARTER
2,944,806
HEATING GASES AND VAPOURS
Filed Jan. 23, 1957
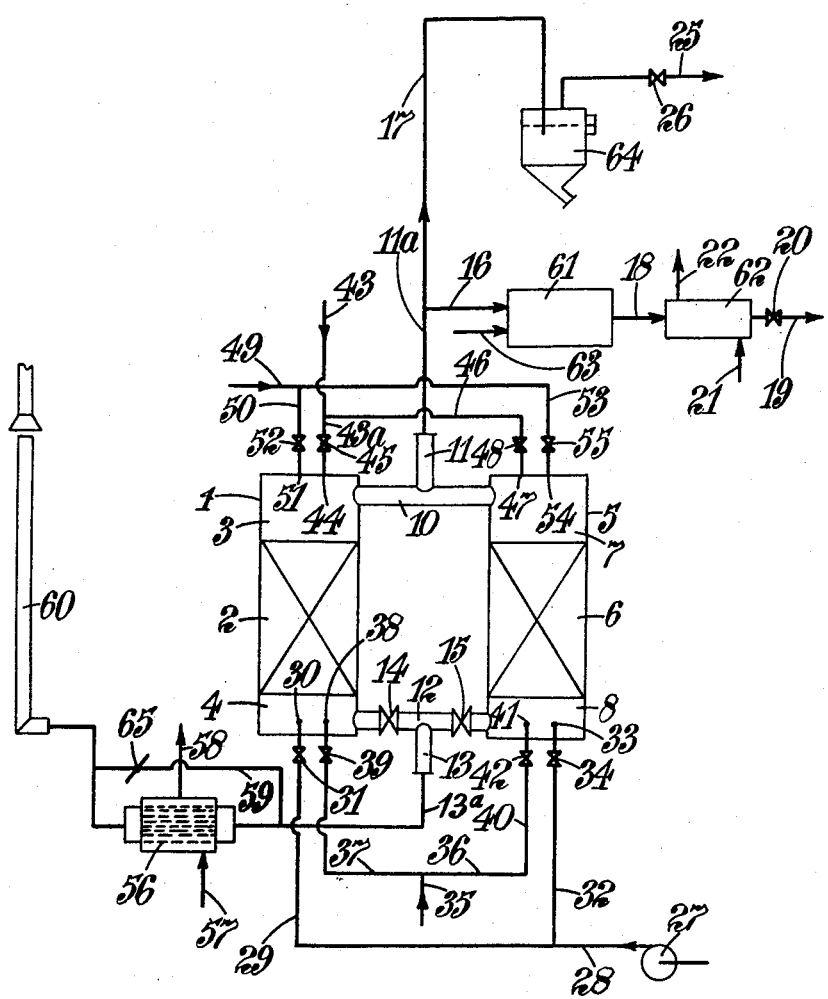
INVENTOR
AUSTIN G. CARTER
By
Watson, Cole, Grindle & Watson
ATTORNEYS

2,944,806

HEATING GASES AND VAPOURS

Austin George Carter, Stockton-on-Tees, England, assignor to The Power Gas Corporation Limited, Stockton-on-Tees, England, a British company Filed Jan. 23, 1957, Ser. No. 635,812

Claims priority, application Great Britain Jan. 23, 1956

3 Claims. (Cl. 263—52)

This invention is for improvements in or relating to heating gases and vapours and has particular reference to a method for heating gases and vapours to a very high temperature and apparatus therefor.

The process of heating gases to high temperatures by passing them alternately with hot products of combustion through heat insulated vessels packed with heat storage material is well-known. Such vessels are called regenerators. In common practice these regenerators are used in pairs, one member of each pair being heated by the passage through it of hot products of combustion, while the other member is giving up its heat to the gas which is being heated. The products of combustion and the gas which is to be heated usually flow through the regenerator in opposite directions (the hot combustion products usually flowing downwards) so that the apparatus has some of the characteristics of a countercurrent heat exchanger.

When the gas is to be heated to a very high temperature, as for example where gaseous reactants are required at a very high temperature in order to carry out an endothermic reaction, the regenerators may be heated directly by burning gaseous or liquid fuel inside them with air which has itself been preheated in some external apparatus, or with air which has been enriched to some extent by the addition of oxygen.

It is the object of the present invention to enable gases and vapours to be heated to very high temperatures without the use of oxygen.

According to the present invention there is provided a cyclic process for heating gases or vapours to a high temperature employing two separate beds or masses of heat storage material in a cycle comprising four major periods in which during the first major period of the cycle air is passed through a first bed which was previously used for heating the gas or vapour, the air becoming preheated, and the preheated air is combusted with gaseous or liquid fuel and the resulting hot products of combustion passed through the second bed, heating up the heat storage material, during the second major period of the cycle gas or vapour is passed through the said second bed in the reverse direction to that in which the products of combustion were passed, being heated to the required temperature and available for use, during the third major period of the cycle air is passed through the said second bed in the same direction as that in which the gas or vapour was passed, the air becoming preheated, and the preheated air is combusted with gaseous or liquid fuel and the resulting hot products of combustion passed through the said first bed in the reverse direction to that in which air was passed, heating up the heat storage material, and during the fourth major period of the cycle gas or vapour is passed through the said first bed in the reverse direction to that in which the products of combustion were passed, being heated to the required temperature and available for use.

Between the first and second major periods of the cycle there may be a short purge period during which gas or vapour is passed through the second bed as during the second major period of the cycle in order to displace the products of combustion into the first bed which is vented to the stack. Between the third and fourth major periods of the cycle there may be a short purge period during which gas or vapour is passed through the first bed as during the fourth major period of the cycle in order to displace the products of combustion into the second bed which is vented to the stack.

It is a feature of the present invention that the heat stored in the heat storage material in either regenerator after the gas or vapour has been heated therein is sufficient for preheating the air passed through the regenerator during the following major period of the cycle to a temperature of at least 600° C.

The present invention also includes apparatus for carrying out the process described, one form of which apparatus comprises two regenerators, a conduit connecting the hot ends of the regenerators and a common gas or vapour outlet in this conduit, a conduit connecting the cold ends of the regenerators, a common gas outlet in this conduit connecting to a stack and valves in this conduit between each regenerator and the common gas outlet, valved connections for the supply of air and gas or vapour to the cold end of each regenerator and valved connections for the supply of gaseous or liquid fuel to the hot end of each regenerator.

Another form of the apparatus comprises two regenerators, a conduit connecting the hot ends of the regenerators and a common gas or vapour outlet in this conduit, the cold end of each regenerator connected by conduit to a separate stack provided with a stack valve, valved connections for the supply of air and gas or vapour to the cold end of each regenerator and valved connections for the supply of gaseous or liquid fuel to the hot end of each regenerator.

The regenerators contain heat storage refractory material capable of withstanding high temperatures, for example, pebbles, checker brick or specially shaped bodies. The bed of the heat storage material may be uniformly of one kind and size of bodies or may consist of two or more layers of different kinds and/or different sizes of bodies.

Each regenerator, the conduit connecting the hot ends of the regenerators and the conduit for passing the hot gas or vapour are lined internally with insulating material which is faced with high grade refractory material resistant to high temperatures. The conduit connecting the cold ends of the regenerators and the conduit for passing the hot products of combustion may also be lined with insulating material faced with refractory material.

During the cycle of operations certain valves are opened and closed in turn. These valves may be opened and closed by hand or automatically by mechanical, hydraulic or electrical means actuated by an automatic timing device.

The products of combustion which pass from the cold end of each regenerator in turn to the stack may be sufficiently hot for the raising of steam in a waste heat boiler, in which case a waste heat boiler may be provided for cooling the products of combustion before they pass to the stack, steam being raised as a by-product or for use in the process.

The present invention may be used wherever a gas or vapour is required at a high temperature in order to carry out a reaction and is especially useful when the reaction is strongly endothermic or when the reaction products are of such a nature that it is impracticable to recover heat from them. Examples of such reactions are, the reaction between steam and carbonaceous material producing water gas, the reaction between steam and hydrocarbons producing combustible gases, including synthesis gas, the reaction between carbon dioxide and carbon producing carbon monoxide and the reaction between carbon dioxide and hydrocarbons producing combustible gases, including synthesis gas.

The envisaged temperature of the heated gas or vapour is generally above 1200° C. and possibly above 1600° C. but the invention is not restricted to any particular range of temperature.

The gas or vapour is heated up during the second and fourth major periods of the cycle during which periods the heated gas or vapour passes to a reactor where the reaction, usually endothermic, takes place and the hot products of reaction then pass to a cooler on the inlet or outlet of which there may be a cyclically operated valve. If necessary during the first and third major periods of the cycle this valve is maintained closed so that the hot products of combustion are caused to pass through one or other of hte regenerators and not to the reactor.

The present invention is particularly suitable for heating steam to a high temperature for the manufacture of oil gas in accordance with British patent specification No. 740,482. In this process the separate reactor referred to above may be unnecessary and in that case the space above the heat storage material in either regenerator may be used for the endothermic reaction between the heated steam and petroleum oil during the second and fourth major periods of the cycle. When this is done the oil gas will leave the space above the heat storage material in either regenerator at a temperature considerably lower than steam at its maximum temperature, thereby reducing heat losses. The hot oil gas is passed to a wash box where it is cooled by contact with water or other cooling fluid and the cooled oil gas passes to the gas washing and purification plant.

The feeding of one of the reactants to the empty space at the hot end of either regenerator during the second and fourth major periods of the cycle and carrying out an endothermic reaction between this reactant and highly heated gas or vapour in this empty space is not restricted to the fed reactant being petroleum oil and the highly heated reactant being steam. For example, the fed reactant could be a hydrocarbon gas, the highly heated reactant could be carbon dioxide and the product of the endothermic reaction a combustible gas. Also part of the fuel combusted with the preheated air to heat up the beds of heat storage material may be residual carbon left in the hot end of the regenerators from the previous major period of the cycle.

Following is a description by way of example of the mode of operation of the present invention in a plant in which steam is heated to approximately 1500° C., which plant consists of two identical regenerators A and B. These are connected together at the top by a duct lined with heat insulating and refractory material, having a branch similarly lined through which the heated steam leaves the plant.

During the first major period of the cycle air is preheated by being blown upwards through A, which has residual heat from the preceding cycle, and is combusted with atomised liquid fuel at the top of B whence the products pass downwards through B, heating the heat storage material therein to a very high temperature, and thence to a stack.

The second major period of the cycle is preceded by a purge during which steam is blown upwards through B, whereby the products of combustion from the first period are swept into A, from which they displace the air. As soon as B has been purged the stack valve of A is closed and the second major period of the cycle starts. The steam, heated to the required high temperature in B, now leaves the plant through the branch in the duct connecting the tops of A and B.

During the third major period of the cycle, air is preheated by being blown upwards through B and is combusted with atomised liquid fuel at the top of A, whence the products pass downwards through A, heating the heat storage material therein to a very high temperature, and thence to a stack.

The fourth major period of the cycle is preceded by a purge similar to that preceding the second period. As soon as A has been purged, the stack valve is closed and the fourth major period begins. The steam, heated to the required high temperature in A now leaves the plant through the branch in the connecting duct.

The heated steam leaving the regenerators will, in general, enter a reaction chamber in which it takes part in the reaction for which it is required.

When the process of the present invention is used for the production of oil gas by the process described in British patent specification No. 740,482, the oil may either be admitted to a separate reaction chamber as above, or it may be atomised into the steam at the hot end of the regenerators. In the latter case the reaction chamber may be dispensed with or it may be suitably utilised to complete the reaction between the oil and the steam.

The invention is further described by way of example with reference to the accompanying drawing, which is in the form of a flow diagram.

Referring to the drawing the apparatus consists of the regenerator 1 containing a bed of heat storage material 2 above which there is an empty space 3 and below which an empty space 4. The regenerator 5 contains a bed of heat storage material 6 above which there is an empty space 7 and below which an empty space 8. The empty spaces 3 and 7 are known as the hot ends of the regenerators while the empty spaces 4 and 8 are known as the cold ends of the regenerators.

The hot ends of the regenerators are connected by a conduit 10, which is provided with an outlet 11 connecting to a conduit 11a. The cold ends of the regenerators are connected by a conduit 12 which is provided with an outlet 13 connecting to a conduit 13a and with the gas control valves 14 and 15 between each regenerator and the outlet 13.

Air blower 27 provides boosted air through the conduit 28 and then through conduit 29, control valve 31 and connections 30 to the cold end 4 of the regenerator 1 or through conduit 32, control valve 34 and connection 33 to the cold end 8 of the regenerator 5.

The gas or vapour to be heated to a high temperature enters at 35 into the conduit 36 and then passes through conduit 37, control valve 39 and connection 38 to the cold end of the regenerator 1 or through conduit 40, control valve 42 and connection 41 to the cold end of the regenerator 5.

Gaseous or liquid fuel enters at 43 and passes through conduit 43a, control valve 45 and connection 44 to the hot end 3 of the regenerator 1 or through conduit 46, control valve 48 and connection 47 to the hot end 7 of the regenerator 5. When liquid fuel is used the connections 44 and 47 terminate in spray nozzles projecting into the hot ends of the regenerators so that the liquid fuel is atomised.

For the production of oil gas in accordance with British patent specification No. 740,482 provision is made for petroleum oil to enter at 49 and pass through conduit 50, control valve 52 and connection 51 to the hot end of regenerator 1 or through conduit 53, control valve 55 and connection 54 to the hot end of regenerator 5. The connections 51 and 54 terminate in spray nozzles projecting into the hot ends of the regenerators so that the petroleum oil is atomised.

The petroleum oil itself can be used as a liquid fuel for heating up the regenerators during the first and third major periods of the cycle, in which case there is no need to supply other gaseous or liquid fuel at 43 entering the regenerators through connections 44 and 47.

When the conduit 11a passes gas or vapour heated to a high temperature the hot gas or vapour passes through a conduit 16 to a reactor 61 where the hot gas or vapour reacts with one or more other reactants entering the reactor at 63. The hot products of reaction pass through conduit 18 to a cooler 62, which is shown with the coolant entering at 21 and leaving at 22, and the cooled products of reaction pass through control valves 20 and conduit 19.

When the conduit 11a passes hot oil gas which has been formed by reacting highly heated steam with petroleum oil in the empty spaces at the hot ends of the regenerators the hot oil gas passes through conduit 17 to a wash box 64, and the oil gas passes through control valve 26 and conduit 25.

The oil gas leaving the wash box is usually passed through a gas washing and purification plant which may be located between the wash box 64 and the control valve 26.

The hot products of combustion passing through conduit 13a can pass through conduit 59 to a stack 60 or they can pass first through a waste heat boiler 56 before passing to the stack. A damper 65, such as a butterfly valve, is preferably included in conduit 59. Feed water enters the waste heat boiler at 57 and steam which is raised by the cooling of the hot products of combustion leaves the boiler at 58.

The regenerators can be heated up from the cold in the following manner. With all control valves initially closed, the hot gas control valve 14 is opened, the air blower 27 started up and the air control valve 34 opened. Air then enters the regenerator 5 through connection 33, passes up this regenerator and through the conduit 10 into the top of regenerator 1, passes down regenerator 1 and through conduit 12, valve 14 and outlet 13 into conduit 13a and then passes to the stack 60.

The fuel control valve 48 is then opened and gaseous or liquid fuel allowed to enter at the top of regenerator 5 through connection 47. The fuel is ignited by inserting an ignition poker (not shown in the diagram) into the empty space 7 near to the fuel inlet connection and the fuel combusted with the air passing up the regenerator 5. Hot products of combustion then pass through the conduit 10 and down regenerator 1 to the stack, heating up the heat storage material in regenerator 1. The top layers of the heat storage material in regenerator 5 will also become heated up.

After a while the fuel control valve 45 is opened and the fuel control valve 48 is closed allowing fuel to enter at the top of regenerator 1 through connection 44. This fuel will then ignite in the empty space 3, which has now become heated, and will combust with the air passing in through the conduit 10, the hot products of combustion passing down regenerator 1 to the stack, as previously, continuing to heat up the heat storage material in regenerator 1. However, by burning the fuel in the empty space at the top of regenerator 1 the top layers of the heat storage material in regenerator 1 will become hotter.

When the heat storage material in regenerator 1 has become sufficiently heated up, the plant is ready for commencing operation according to the process of the present invention.

At the commencement of the first major period of the cycle gas control valve 15, air control valve 31 and fuel control valve 48 are opened, all the other control valves being closed. Air from the blower 27 is passed up the regenerator 1 and becomes heated by the hot heat storage material in the regenerator. Preheated air passes through conduit 10 to the top of regenerator 5 and combusts with the fuel in the empty space 7. A high flame temperature is reached and the hot products of combustion pass down regenerator 5, heating up the heat storage material, and then through valve 15, conduit 12, and conduit 13a to the stack.

Air control valve 31, fuel control valve 48 and hot gas control valve 15 are closed and gas control valve 14 and gas or vapour control valve 42 are opened. Gas or vapour passes up the regenerator 5, becoming heated to a high temperature and driving out the products of combustion in the regenerator 5 which pass down regenerator 1 and then through valve 14 and conduit 13a to the stack. This period of the cycle is a purge period and is of short duration.

At the commencement of the second major period of the cycle the outlet gas control valve 20 is opened and the gas control valve 14 closed. The highly heated gas or vapour will now pass from the top of the regenerator 5 through conduit 10 and outlet 11 into conduit 11a and then through conduit 16 to the reactor 61, from where the products of reaction will pass to cooler 62 and onwards.

Gas or vapour control valve 42 and outlet gas control valve 20 are closed and gas control valve 14 and air control valve 34 are opened. Air passes up the regenerator 5 driving the gas or vapour before it and becoming heated. The gas or vapour and then the heated air pass through conduit 10, down the regenerator 1 and through valve 14, conduit 12, conduit 13a to the stack. This period of the cycle is a purge period and is of short duration.

At the commencement of the third major period of the cycle the fuel control valve 45 is opened and fuel from the inlet 44 combusts with preheated air in the empty space 3. A high flame temperature is reached and the hot products of combustion pass down regenerator 1 heating up the heat storage material and then through conduit 12, valve 14 and conduit 13a to the stack.

Air control valve 34, fuel control valve 45 and gas control valve 14 are closed and gas control valve 15 and gas or vapour control valve 39 are opened. Gas or vapour passes up the regenerator 1 driving out the products of combustion in regenerator 1 and becoming heated, which products of combustion pass down regenerator 5 and then through valve 15 and conduit 13a to the stack. This period of the cycle is a purge period and is of short duration.

At the commencement of the fourth major period of the cycle the outlet gas control valve 20 is opened and the gas control valve 15 closed. The highly heated gas or vapour will now pass from the top of the regenerator 1 through conduit 10 and outlet 11 into conduit 11a and then through conduit 16 to the reactor 61, from where the products of reaction will pass to cooler 62 and onwards.

Gas or vapour control valve 39 and outlet gas control valve 20 are closed and gas control valve 15 and air control valve 31 are opened. Air passes up the regenerator 1 driving the gas or vapour before it and becoming heated. The gas or vapour and then the heated air pass through conduit 10, down regenerator 5 and through conduit 12, valve 15 and conduit 13a to the stack. This period of the cycle is a purge period and is of short duration.

After this last purge period the full cycle of operations has been completed and a first major period of a new cycle is commenced when the fuel control valve 48 is opened and fuel from the inlet 47 combusts with preheated air in the empty space 7.

When making oil gas according to British patent specification No. 740,482 steam is passed through the highly heated regenerator during the second and fourth major periods of the cycle and at the commencement of these periods outlet gas control valve 26, instead of valve 20, is opened and either control valve 55 or 52 is opened to allow petroleum oil to be sprayed into the empty space at the top of the highly heated regenerator, which oil reacts with highly heated steam to yield oil gas. The hot oil gas is passed through conduits 11a and 17 to wash box 64, and the oil gas passes onwards through valve 26.

If the petroleum oil is also used as a fuel for heating the regenerators, at the commencement of the first and third major periods of the cycle, control valve 55 or 52 is opened instead of control valve 48 or 45.

I claim:

1. A process for heating gaseous and vaporous material to a high temperature employing two separate heat storage zones, each having a combustion zone in open communication therewith, and utilizing a cycle having four major periods, which process comprises the following steps: (1) during the first major period passing air through a first heat storage zone, which has been heated during the previous cycle, to preheat the air, passing the preheated air through the first combustion zone into the second combustion zone, combusting the preheated air with fluid fuel in said second combustion zone, passing the resultant hot products of combustion through said second heat storage zone to heat up the same and discharging said products to the atmosphere; (2) during the second major period passing the material to be heated through said second heat storage zone and thence through said second combustion zone in a reverse direction to that in which the products of combustion were passed in the previous period to thereby heat up said gas, and withdrawing said material for use directly from said second combustion zone while passing no gas or vapor through said first zones; (3) during the third major period passing air through said second heat storage and combustion zones in the same direction as that in which the gas to be heated was passed during said second period to pre-heat said air, passing the pre-heated air from said second combustion zone into said first combustion zone, combusting said air with fluid fuel in said first combustion zone, passing the resultant products of combustion through said first heat storage zone to heat up the same, and discharging said products to the atmosphere; and (4) during the fourth major period passing the material to be heated through said first heat storage zone and, thence, through said first combustion zone in a reverse direction to that in which the products of combustion were passed in the third period to thereby heat up said gas, and withdrawing said material for use directly from said first combustion zone while passing no gas or vapor through said second zones.

2. A process as in claim 1 wherein said material to be heated is heated to a temperature above about 1200° C.

3. A process as in claim 1 wherein the process includes between the first and second major periods and between the third and fourth major periods of the cycle the step of passing for a short period purge gas through the second storage and combustion zones and through the first storage and combustion zones, respectively, in a reverse direction to that in which the combustion products passed therethrough and venting said purge gas to the atmosphere in order to displace said products from the respective pairs of zones prior to passage of the material to be heated.

References Cited in the file of this patent

UNITED STATES PATENTS

| 2,313,157 | Linder | Mar. 9, 1943 |
| 2,605,176 | Pearson | July 29, 1952 |
| 2,714,058 | Stookey et al. | July 26, 1955 |
| 2,734,811 | Totzek et al. | Feb. 14, 1956 |
| 2,807,528 | Pettyjohn et al. | Sept. 24, 1957 |

FOREIGN PATENTS

| 501,230 | Canada | Apr. 6, 1954 |
| 693,724 | Great Britain | July 8, 1953 |